(12) United States Patent
Skogsrud et al.

(10) Patent No.: US 9,836,131 B2
(45) Date of Patent: Dec. 5, 2017

(54) METHOD OF GENERATING SYMBOLS FROM A CHORDING KEYBOARD

(71) Applicant: Bengler AS, Oslo (NO)

(72) Inventors: Simen Svale Skogsrud, Oslo (NO);
Even Eidsten Westvang, Oslo (NO);
Øyvind Rostad, Oslo (NO)

(73) Assignee: Bengler AS, Oslo (NO)

( * ) Notice: Subject to any disclaimer, the term of this patent is extended or adjusted under 35 U.S.C. 154(b) by 0 days.

(21) Appl. No.: 14/892,161

(22) PCT Filed: May 19, 2014

(86) PCT No.: PCT/US2014/038647
§ 371 (c)(1),
(2) Date: Nov. 18, 2015

(87) PCT Pub. No.: WO2015/178888
PCT Pub. Date: Nov. 26, 2015

(65) Prior Publication Data
US 2016/0170500 A1    Jun. 16, 2016

(51) Int. Cl.
*G06F 3/02* (2006.01)
*G06F 3/023* (2006.01)
*G06F 3/01* (2006.01)

(52) U.S. Cl.
CPC ............ *G06F 3/0235* (2013.01); *G06F 3/014* (2013.01)

(58) Field of Classification Search
CPC .......................... G06F 3/0235; G06F 3/0234
See application file for complete search history.

(56) References Cited

U.S. PATENT DOCUMENTS

| | | | |
|---|---|---|---|
| 7,196,691 B1 * | 3/2007 | Zweig | G06F 3/0235 345/168 |
| 7,555,732 B2 * | 6/2009 | Van der Hoeven | G06F 3/0237 345/168 |
| 2013/0135208 A1 * | 5/2013 | Volkov | G06F 1/1626 345/168 |

* cited by examiner

*Primary Examiner* — Dennis Joseph
(74) *Attorney, Agent, or Firm* — Kim Rubin Patent Agent

(57) ABSTRACT

A method of generating symbols from a chording keyboard is described. A unique feature of this method is accepting a sequence of chords from the keyboard without either an intervening chord or a requirement that all keys be released between chords. Another unique feature is that the chord map is independent of chords before or after a particular chord, for a particular symbol. That is, a user need only memorize one chord for each symbol, and then may transition directly from exactly that chord to any other chord. There are no special transition requirements. The number of keys on a keyboard for this method may be 4 to 10, inclusive. Such a keyboard may be operated with one hand. Specific attributes of embodiments or chord tables are described.

1 Claim, 5 Drawing Sheets

PRIOR ART

Fig. 4

- ●○○○○ (space)
- ●●●●○ e
- ●●○○○ t
- ○●○○● a
- ●●○○● o
- ●○●●○ i
- ●○○●○ n
- ●○●○○ s
- ○●●●● r
- ●●●○○ h
- ●●○●○ l
- ○○●●○ d
- ●●●○● c
- ○○○○● u
- ●●○●● m
- ○●○○○ f
- ○○○●○ p
- ●○○○● g
- ●○●○● w
- ○○●○○ y
- ○●○●○ b
- ○●○●● ,
- ○●●○○ .
- ○○●●● v
- ●●●●● k
- ○○○●● x
- ○○●○● j
- ○○○○○ (null)
- ●○●●● q
- ●○○●● z
- ○●●●○ (cmd1)
- ○●●○● (cmd2)

METHOD OF GENERATING SYMBOLS FROM A CHORDING KEYBOARD

TECHNICAL FIELD

The technical field of this invention is keyboards. More specifically, the technical field is chording keyboards. That is, keyboards wherein a combination of keys, a "chord," may be depressed at one time to represent a symbol, and where such chords are part of the normal "typing" mode of the keyboard. Such keyboards are alternatively called chord keyboards, permuted keyboard or combinatorial keyboards.

BACKGROUND ART

Prior art patents include: U.S. Pat. No. 4,042,777; U.S. Pat. No. 4,381,502; U.S. Pat. No. 4,502,038; U.S. Pat. No. 4,555,193; U.S. Pat. No. 5,267,181; U.S. Pat. No. 654,291; U.S. Pat. No. 4,655,621; U.S. Pat. No. 5,642,108; U.S. Pat. No. 5,649,223A; WO9315454A1; WO9315454A1; and WO1993015454A1.

Embodiments of this invention are for a one-handed, chording keyboard.

Chording keyboards have been in use for decades as special purpose keyboards, for example, by stenographers, court reporters, braille entry, and by people with handicaps. Prior chording keyboards have not been successful at replacing QWERTY keyboards for general use.

Because chords are multiple keys pressed at one time, some method of "disambiguating" chords is required, since it is not possible to press the exact chord key combination for all keys perfectly simultaneously.

The most common method for disambiguation is to require that all keys be released between chords. The recognized chord is then the key combination with the most keys pressed between the all-released states. The disadvantage of this method is that multiple actions are required for each chord—specifically multiple finger presses and multiple finger releases, for most (>50%) chords.

Another disambiguation method in the prior art (e.g. U.S. Pat. No. 40,427,777) is to use a single key release, or a first key release as a trigger to recognize the chord. This method has the serious problem that the user-performed transitions between chords change depending on the chord pairs. Chording is hard enough to learn without the now hundreds of different chord transitions to learn for this method.

Some prior art chording keyboards permit a single finger to press more than one key at a time. This approach is fundamentally different than a "pure" chording keyboard in which each finger presses only key at a time; it may permit one-handed operation due to the larger number of available keys. However, precise finger positions are required, and thus learning time is long and the mistake rate is relatively high.

Some prior art disambiguation algorithms are aimed at telephone-style keyboards being used for text, where each key may represent more than one letter. These approaches generally required a dictionary to guess what word the user is attempting to type. These keyboards are also not pure chording keyboards, where there is a high correspondence (75% to 100%) between a single chord and a single letter or function.

Some prior art use time for disambiguation. The idea is that the time interval required by the user between one key and another key to achieve all keys pressed for a chord ("cord creation gaps") is less than the time that all chord keys are held down. The serious problem with this method is: first, that the chord creation gap time is highly variable by the individual user, the user's experience, how tired or distracted the user is, and the complexity of the source text. Thus, the selection of a maximum time threshold for allowance of cord creation gaps must either be variable, or long. Variable timing produces highly inconsistent keyboard operation, which is highly unpredictable and undesirable for users. The second problem with this method is that it limits the maximum typing rate. Since users often choose to learn and use a chording keyboard in order to increase their typing speed over a QWERTY keyboard, this limitation defeats the primary reason to use such a keyboard.

Non-patent literature includes:

GKOS ("Global Keyboard Open Standard") shown on the web URL, gkos.com, downloaded 6 Mar. 2014.

A challenge with chording keyboards is that the user is not able to depress multiple keys with multiple fingers truly simultaneously. Thus, for some transition period of time, the input is ambiguous. Two solutions exist in the prior art to resolve such ambiguity. The first solution requires that chords be held for a minimum period of time, a chord resolving (or disambiguation) time. The second solution requires that all keys be released between combinations, then to select the key combination where the most keys were simultaneously depressed as the chord.

The problem with the first solution is that, in practice, it does not work reliably. More advanced users need a shorter resolving time so that the keyboard keeps up with their typing speed. Beginning users need a longer resolving time to avoid accidentally encoding extra characters. However, a more serious problem is that the ambiguity time varies significantly by which keys are in the chord and the by sequencing of chords, with some sequences being more difficult, and therefore take longer to resolve. In addition, users are not consistent. For example, a user that is tired is likely to require longer resolving times. Thus, neither fixed nor selectable resolving times are an effective means of resolving chord ambiguity.

The problem with the second prior-art solution is that two sets of finger motions are required to encode each symbol. That is, fingers must first depress the keys in each chord, then release those keys. While the requirement to both depress and release for each symbol is also a requirement for common QWERTY keyboards, QWERTY keyboards require only a single finger action for each key, which, in aggregate, is less finger motion and less hand muscle activity to enter symbols than for a chording keyboard in this prior art implementation. In addition, in a QWERTY keyboard potential ambiguity due to multiple keys being depressed at the same time is normally resolved by simply using only the depressing of a key to indicate desired action of that key, and then ignoring the hold time or release time of keys.

Since a key purpose of chording keyboards is efficiency—as measured by either typing speed, or the convenience of using only hand for typing, the efficiency loss as described above, when compared to QWERTY keyboards, is the primary reason that chording keyboards are not widely used.

DISCLOSURE OF THE INVENTION

Embodiments of this invention overcome the weaknesses and limitations of the prior art for pure chording keyboards.

An exemplary embodiment is a one-handed keyboard, with a single key for each finger. (Generally, we consider the thumb a finger, unless otherwise clear.) Some embodiments use two, three or four possible keys for the thumb, or use a three or four position key for the thumb.

A key novelty is that user may move from any chord directly to any other chord without having to release all of the keys between chords. Each chord produces a unique, pre-determined output. Chord transitions do not depend on the two chords ("chord pair") surrounding the transition. Timing is a consideration in the disambiguation method, but timing of a single keyboard state transition is not the only input parameter for disambiguation of chords and outputting selected symbols.

The above novelty permits faster typing than keyboard that require all keys, or indeed a single key, to be released between chords.

In embodiments, the chord of "all keys release" is not treated special in the process of chord recognition. However, key embodiments use the all keys released chord to produce a "null" output.

In some embodiments, a first chord consisting of a first subset of keys may transition directly to a second chord consisting of a second subset of keys, where the second subset comprises the first subset, without any key being required to be released to recognize both the first and second chord. For example, a first chord may consist of keys 1 and 2, for the letter, "t"; a second chord may consist of the keys 1, 2 and 3, for the letter, "h", and a third chord may consist of the keys 1, 2, 3, and 4, for the letter, "e." The word, "the" may be thus be typed by moving from pressed keys 1-2 to keys 1-2-3 to keys 1-2-3-4 without any keys being released between "t" and "h" or any keys released between "h" and "e". Typing the word "the," in this embodiment, requires with fewer total finger motions that prior art keyboards.

Note also that as another example of the above embodiment, consider cording the letters "e", "h" and "t" in sequence, using the chord definitions from the above example. Transitioning from "e" to "h" requires only releasing key 4. Transitioning from "h" to "t" requires only releasing key 3. And, if a space follows the "t", that transition requires only releasing key 2. (See FIG. 4 for chord definitions.) Note that no transition or keyboard state change involving the depressing of a key is required to recognize and output the letters and space, "eht_". Compare this simplification, speed, consistency and improvement to the prior art in U.S. Pat. No. 4,042,777, where the recognition of all cords must begin with a key depress operation.

Note also as another example, shown in FIG. 5, the text sequence, from the start of Lewis Carroll's, Alice in Wonderland, "Alice was beginning to get very . . . " has no requirement at any point that all keys be released. One advantage of not having to release all keys, except when the user desires or is tired, is that the keyboard may be held firmly in one hand because at least one key is depressed during typing.

In some embodiments, the keyboard may be held in one hand. That is, the keyboard does not need to rest on a surface. This permits typing on the keyboard while the user is moving, such as while walking. It also permits the user to use his or her second hand for some other operation, such as using a tablet or operating machinery, while the user's position may be dictated by ideal position for use of that second hand. For example, a doctor may be using examining a patient with the second hand, while recording observations with the first hand using a chording keyboard of this invention.

In some embodiments, two outputs from the keyboard are generated in parallel. The first output being a sequence of assigned letters (see definition, below, for "letters") for chords as the chords are tentatively recognized; the second being a word in a dictionary where the word comprises a the chord sequence for the chords as finally recognized. In this embodiment, the second output, the dictionary word, replaces the first output. If a sequence of chords is not in the dictionary, the second output is not used.

In some embodiments, each key transition from the keyboard is assigned an "event score," which may depend fully or partially on the timing between this event and the prior event. Multiple, possible chords and cord sequences are considered in parallel and a chord or sequence with the most favorable aggregate event score is selected. Such selection may depend on the receipt of a terminator, such as a space of period; or may depend on whether or not a sequence is in a dictionary. See the definition, below, for "dictionary."

Some embodiments include automatic capitalization, automatic punctuation, spell correction, and substitution of abbreviations.

BRIEF DESCRIPTION OF DRAWINGS

FIG. 4 is an exemplary chord table showing one possible mapping from chords to symbols.

BEST MODE FOR CARRYING OUT THE INVENTION

Figure 1A:
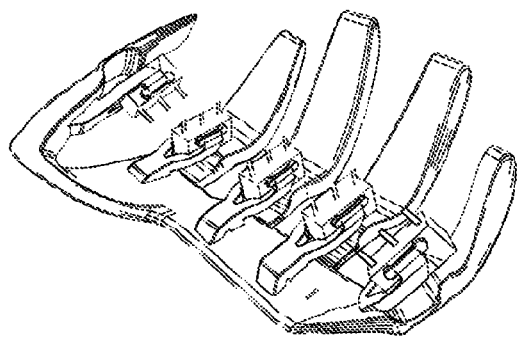
FIGS. 1A, 1B, 1C and 1D are drawings of multiple views one embodiment of a chording keyboard.
Figure 1B:
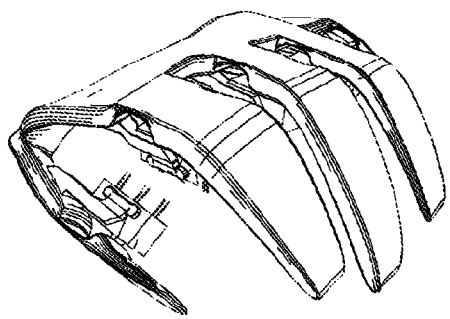
Figure 1C:
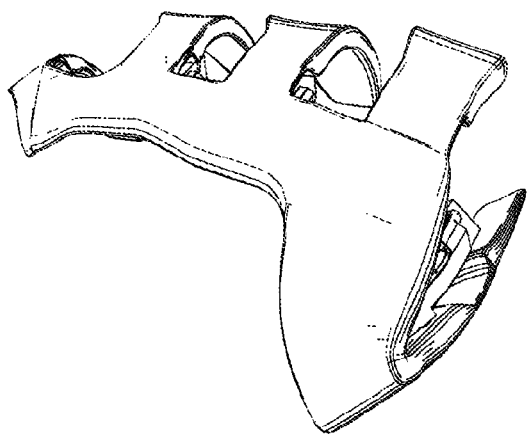
Figure 1D:
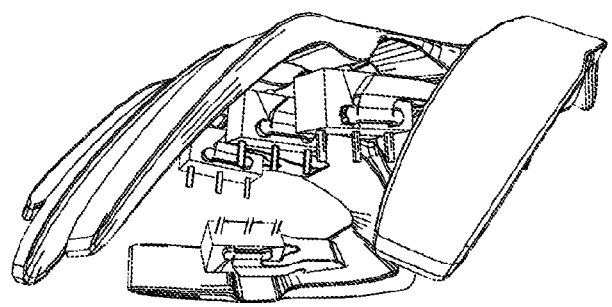

One embodiment of a chording keyboard comprises five keys—each key to be operated by a dedicated finger of one hand. We refer to the thumb as a finger, herein, unless otherwise noted. Keys have two states, which we refer to as depressed and released. Note that there is no requirement for mechanical key motion, as keys may be touch sensitive, pressure sensitive, heat sensitive, or detect finger position optically or by other means. Optical detection may use a camera, or optical beams. Generally, a depressed key means a state corresponding to a fingertip that is more palmar while a released key state corresponds to a fingertip that is more dorsal. However, depressed and released key state names are arbitrary.

Some chording keyboards may have six keys, where the thumb operates two keys. Two thumb keys may be next to each other, or may detect orthogonal thumb movement.

In another embodiment, a thumb-operated key may have three states, corresponding to neutral, up (dorsal) and down (palmar).

A basic chording keyboard with five, two-state keys has $2^5$ or 32 possible chords. With a three-state thumb key, or two thumb keys, the keyboard has $2^4*3=48$ possible chords.

In this invention, each chord is predetermined mapped to one symbol s from a symbol set with S symbols. A small number of chords are used as function keys, or escape keys. For example, one key may shift in and out of capital letters, or shift in and out of a number-plus-symbol symbol set. In some embodiments a symbol x may be mapped to more than one chord.

An exemplary chord table or map is shown in FIG. 4. The shown character set is the 26-letter Roman alphabet, plus three punctuation characters: comma, period, and space.

Some prior art keyboards permit more than one key to be depressed at once. For example, on common QWERTY keyboards, shift keys may include a SHIFT, a CNTRL, an OPTION, a COMMAND and an FN key. Some combinations of these shift keys are permitted in combination with a regular "alphabet" key.

A key distinction between a traditional keyboard, such as a QWERTY keyboard, and a chording keyboard, is that "chords" are used for bulk of typing, (>50% of all symbols entered) including the representations of most (>50%) alphabetic characters.

A chording keyboard may be designed to be operated with one hand or two hands. Similarly, a conventional keyboard may be designed to operate with one or two hands. For example, a "10-key" adding machine style keyboard is designed to operate with one hand. However, in general, traditional keyboards for general textual typing are designed for two-handed operation. An ideal chording keyboard of this invention is a chording keyboard is designed for one-handed operation. Note that the only widely successful chording keyboard to date is a stenographer's keyboard, which is a two-handed keyboard.

A traditional QWERTY or Dvorak keyboard typically ranges from 61 to 104 keys. For a 61 key keyboard, the number of possible chords is $2^{61}$, or 2,305,843,009,213,690,000. Whereas, with a 5-key chording keyboard the number of possible chords, or keyboard states, is $2^5$ or 32.

Therefore, a appropriate way to numerically separate a traditional keyboard from a chording keyboard is to look at what fraction of the total possible chords of a keyboard are mapped to a symbol from a predefined symbol set. For the example in FIG. 4, 29 of 32 possible chords are mapped, for a ratio of 29/32 or 90.6%. (In practice, all chords are mapped; however assignments of functions are not shown in FIG. 4.) A traditional QEWRTY or Dvorak keyboard may have 200 to 400 total symbols and functions defined, for a miniscule percentage of $2^{61}$ possible chords. Another way to numerically separate chording keyboards from traditional keyboards is to consider what fraction of keystrokes required to enter a standard text corpus are single keystrokes compared to chord combinations.

In one embodiment, we use a minimum ratio of 50% of all possible chords mapped to a unique character, as a definition of a chording keyboard. In another embodiment, we use a minimum ratio of 25%. Other embodiments use 75% or 100%.

A prior art chording keyboard requires that the user release all keys between non-null symbol chords. A steno keyboard is an example of such prior art. Each chord—typically used for a syllable or phonetic sound—is demarked in a chording sequence by the state of all keys on the keyboard released.

A novel aspect of this invention is that such release between symbol-generating chords is not required. This difference reduces by about half the number of total finger motions required to key-enter a typical text corpus. Note that if the cord consisting of all keys released is mapped to the null symbol, that a user may release all keys to relax, think or take a break, with no impact on the flow of text, nor any change to the required chords.

For reference purposes, one appropriate corpus to use is the text of Lewis Carroll's *Alice in Wonderland*. Another suitable reference corpus is the text of all articles beginning on the front page of the New York Times. An exemplary date for such a corpus is the filing date of this patent application. http://corpus.byu.edu/ provides multiple English language and other language corpuses ranging in size from 34 million words to 1.9 billion words. Yet anther suitable reference corpus is the Brown University Standard Corpus of Present-Day American English.

Figure 2:
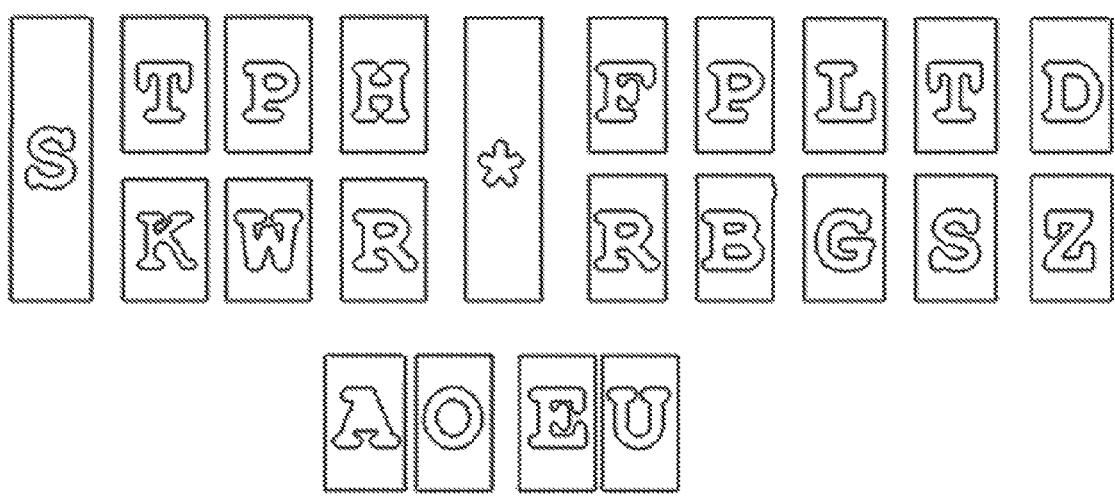
FIG. 2 is an example of prior art in chording keyboards.

An example of prior art is a stenotype keyboard. Such a keyboard is shown in FIG. 2. Typically, four finger tips of the left hand are placed in a neutral position between the top and bottom consonant rows on the left side of the * key; and four finger tips of the right hand are placed in a neutral position between the top and bottom consonant keys on the right side of the * key. The * key and the vowel keys are operated by the thumbs. Each finger (not including the thumb) may depress the key above (such as the T, P, L or D keys) the fingertip; or the key below the fingertip (such as the K, W, G or G keys), or both keys at the same time (such as the P and W keys together, or the L and G keys together). In this way the vertical key pairs (such as P-W and L-G) may be viewed as a four-position or four-state key (i.e., none, P, W, and PW). The stenotype keyboard is typically used to generate single characters, syllables, sounds, and whole words, as well as some punctuation and functions (such as new page). Some keyboards have additional keys, such as a number bar.

However, for each chord on the stenotype keyboard to generate a symbol, all keys must be released. Thus, each symbol generated requires at least down downward motion and at least one upward motion.

In addition, the stenotype keyboard must be operated with both hands.

The present invention differs from this example of prior art in two very significant ways. First, it may be operated with one hand. Second, it is not necessary to release all keys in between chords. Also, any chord may transition directly to any other chord. Also, the definition of chords does not change depending on the previous or later chords. Also, the rules for disambiguation of chords do not depend on the user's skill, experience, speed or error rate.

In some embodiments there is a one-to-one mapping from a user's fingers to keys, except for the thumb, which may operate 1, 2, 3, 4 or 5 keys, or keys with multiple positions, such as a three or four position key.

A keyboard capable of generating general-purpose text that can be efficiently and effectively operated by one hand has high value. For example, a person's second hand may be used to operate a mouse, trackball, pen, or stylus. The person's second hand may hold an object, such as a source material; or may be tracking source material such as lines in a book or on a screen. The person's second hand may be used for a second activity not directly tied to entering text; but which may, however, be related to the text being entered. For example, one hand may be used to direct an orchestra while the second hand enters symbols related to the music being played in real-time. The person may only have one fully functional hand. As another example, a physician may use one had to assist in examining or treating a patient, while the other hand enters text or commands.

A keyboard that is a capable of being operated by hand is far more portable than prior art keyboards. For example, it may be used while walking, or with the operating hand in a pocket or inside a coat.

FIG. 1 shows a drawing of one embodiment of a chording keyboard. This keyboard has five keys, each key to be operated by one finger of one hand.

FIG. 2 shows the prior art in chording keyboards. This keyboard is a basic stenotype keyboard.

Figure 3:
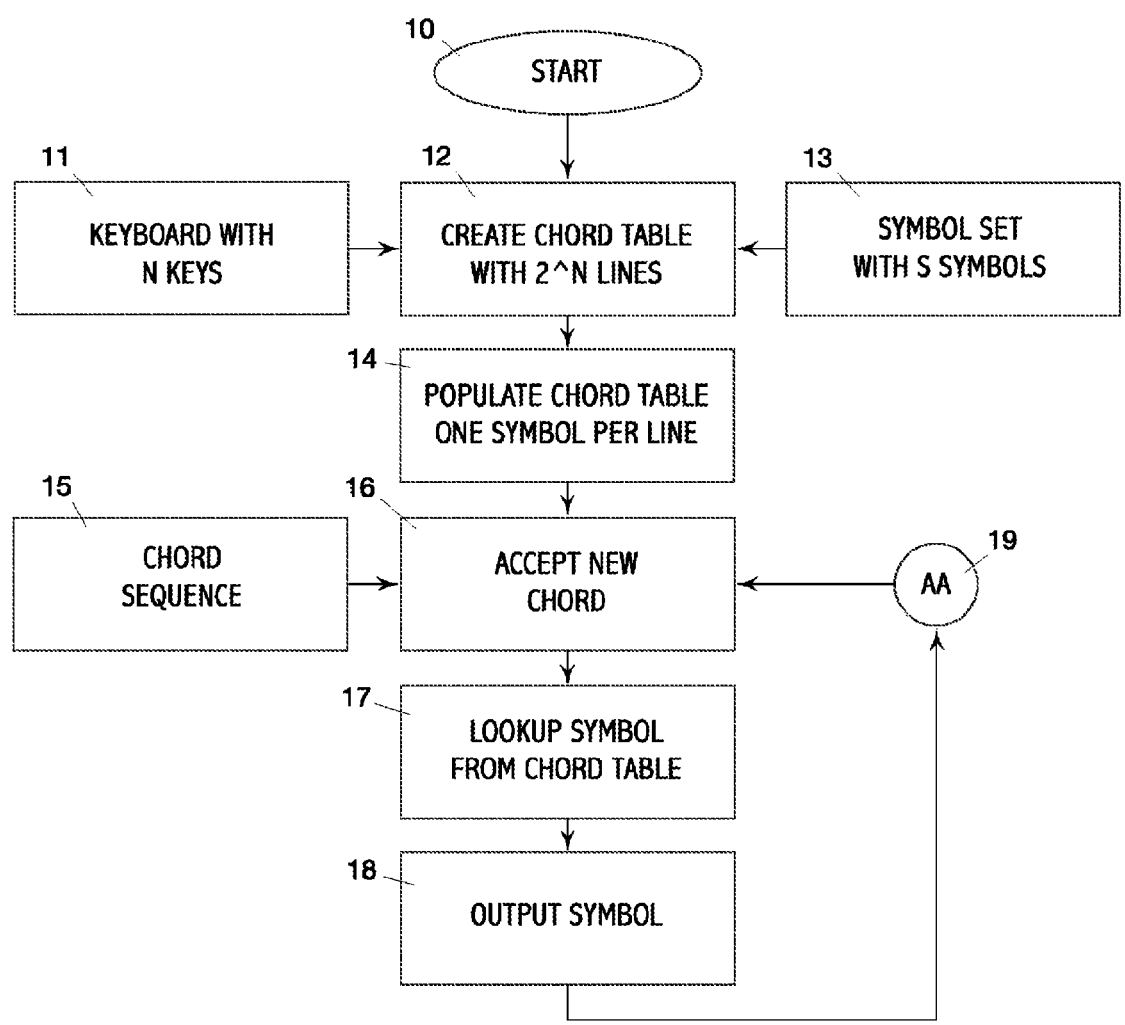
FIG. 3 is a flowchart showing one embodiment of an algorithm that implements an exemplary embodiment of a method of this invention.

FIG. 3 shows an exemplary flowchart of one embodiment. The method of the embodiment starts at 10, then, at 12, a keystate table with $2^n$ line in the table is created for a keyboard with n, two-state keys. The specifications for the keyboard are shown as 11 in the Figure. Embodiments may include keyboards with more than n keys, and some keys may have keys with more than two states. For such embodiments, the flowchart may be altered to include a larger keystate table. For example, if all keys have three states, the keystate table has $3^n$ lines. A keyboard with four two-state keys and one three-state key has $2^4 \times 3$ lines. Note that a three-state key may be implemented as two, two-state keys next to each other, designed to be operated by a single finger, but not both at the same time. A four-state key may be similarly constructed. In one embodiment, a thumb key has five states: neutral, up, down, left and right.

The purpose of the keystate table in step 12 is to identify every possible combination of every key in the keyboard, or in a sub-keyboard. For example, a keyboard may have five keys that are the chording sub-keyboard used in the method of an embodiment, plus one or more keys on the keyboard that are part of the keyboard but not part of the chording ability of the keyboard.

Not every line of the keystate table necessarily corresponds to a non-null symbol. However, the highest efficiency (in terms of total symbols available compared to the number of keys) is obtained when the keystate table is reasonably full, such as at least 10%, or 25% or 50% or 75% or 90% full. Here, these fullness percentages mean the number of lines in the table that correspond with unique, non-null symbols.

A symbol set comprising S symbols is defined, in step 13. Generally, each symbol is the set corresponds to one line in the keystate table. The table is used to lookup, map or match a given chords to one symbol. Note that not every symbol in the set must be in the keystate table, and not every line of the table must have a symbol, and some symbols may appear in more than one line of the table. However, the percentages listed in the prior paragraph are desirable to achieve keyboard efficiency, and are a novel element of embodiments compared with prior art.

Step 14 shows populating the keystate table with symbols from the symbol set. Each line in the table may be viewed as a 2-tuple, comprising a unique chords and a possibly unique symbol, or, for some lines in some embodiments, a null symbol.

Generally, steps 10, 11, 12, 13 and 14 are only done once, for one implementation of an embodiment for a specific keyboard design, language, and purpose. In some embodiments, the steps 13 and 14 are predetermined, and are not user-alterable. Note, however, that custom symbol sets and custom mapping may be used in some embodiments, including user-created symbols sets and mapping. That is, a user may perform step 12, step 13, or step 14, or any combination of these.

Steps 15 though 19 are generally performed repetitively, once per character or symbol generated by a user using the chording keyboard of these embodiments.

In step 15, a chord sequence is provide to step 16. Such a sequence may come directly from a keyboard, or a keyboard scanner or parser, or from an intermediate device between a keyboard and step 16. Such generation may be provided via hardware, or firmware or software running on a general purpose or specific purpose processor or computer. In one embodiment, a microprocessor such as a PIC or ARM chip with Flash memory for the program is used to scan a physical keyboard an generate the sequence via an electrical serial interface; or via a software interface, such as a method of an object, or software function call, subroutine or interrupt.

The passing of chords from step 15 to step 16 may include information on the time between chords, or other information.

Note that step 15 may be sophisticated in determining chords, or in disambiguating keyboards states. Note also that all keys released is a chord. Thus, a keyboard changing from a first state to a second state, then from the second state to a third state, where the second state is all keys released, comprises two separate state changes, because all keys released is a chord. Transitions both into this chord (releasing all keys) and out of this chord (depressing one or more keys) are transitions reported from step 15 to step 16.

In step 16 a new chord is accepted. The chord table created in step 12 and populated in step 14 is used to lookup the corresponding symbol and that symbol is output in step 18. This process repeats via a loop shown as 19.

The simplified flowchart in FIG. 3 does not include common functions such a backspace, or meta functions, or options such as changing to a different character set (or symbol set), or initializing or terminating operation of this method. Implementation of such features and capabilities are well known to those trained in the art.

Note that the specific steps shown in FIG. 3 are logical steps. Implementation via hardware, firmware or software may take many different forms, structures or computer languages, and steps may be combined or the order of steps changed, as is well known to those trained in the art.

Of crucial important in this invention are key aspects of embodiments that are novel and non-obvious over prior art. In some embodiments the chording keyboard is adapted to used effectively by one hand, which means that n is in the range of 4 to 9 inclusive, or in the range of 5 to 7 inclusive. This limited number of keys is a dramatic departure from traditional QWERTY or Dvorak keyboard, generally with 61 to 104 keys, and also a dramatic departure from a stenotype chording keyboard, which has at least 22 keys. It is also a departure from a 10-key adding machine keyboard, because such a keyboard supports neither chords nor text entry.

Also of crucial importance is the percent of lines in the comprehensive keystate table (with at least $2^n$ table lines), being populated with non-null, unique symbols for at least 10%, 25%, 50%, 75% or 90% of the lines. The prior art stenotype keyboard has over 100,000 possible chords, yet only a tiny fraction of all possible chords have a defined meaning, associated symbol, word or text fragment.

Yet another difference between the prior art stenotype machine and embodiments of this invention include the pre-determined symbol set and mapping, shown as steps 13 and 14. Many stenotype chord meanings are set by the user, rather than being pre-determined. In addition, the output from embodiments of this invention are deterministic, like the keys in a non-chording keyboard (such as a QWERTY keyboard) whereas the meaning of many chords in a stenotype require interpretation and often correction by the user or a proofreader. Thus, in this invention step 18 in FIG. 3 is performed by a machine based on the table created in step 14, whereas for a stenotype machine the equivalent of step 18 is performed, at least in part, by one or more humans.

Also of crucial importance and a novel and non-obvious difference between prior art and embodiments of this invention is that a high fraction (at least 50%, 75%, 90% or 100%) of all chords transitions generate a non-null symbol output.

The chording keyboard of a stenotype generates output symbols after at least two chords changes, including the state where all keys are released.

FIG. 4 shows an exemplary chord table. Each rectangle represents one chord. Each of the five circles in the rectangles indicates one key position, for five keys. The key on the left for the thumb, then for the index finger, middle finger, ring finger, and pinky fingers, moving left to right. A black circle indicates that the key is depressed. A white circle indicates that the key is released. The letter or symbol (such as space, comma, or period) is shown in the Figure to the right of its corresponding chord.

Figure 5:
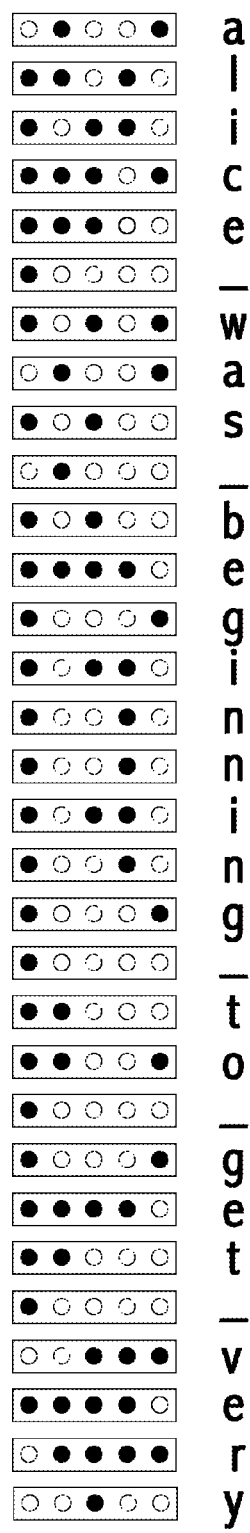
FIG. 5 is an exemplary series of chords to produce sample text.

FIG. 5 shows an example of text being encoded with chords from the chord table of FIG. 4. This text is the first six words of Lewis Carroll's, Alice in Wonderland.

Performance

In one test, using an operating with a nominal amount of practice with a prototype keyboard, average time between cords was measured in the range of 40 to 60 milliseconds, corresponding to about 20 chords per second, which is approximately equivalent to 160 to 200 words per minute compared to typing speed on a conventional keyboard.

Notes on Claims

One claim differs from prior art specifically in the limitation, "wherein at least 75% of all chords in the chord sequence cause a non-null symbol to be outputted." Prior art chording keyboards required that all keys be released between meaningful chords. As we consider, for the purposes of this invention, the keyboard state of all keys released to be a valid chord, this means that in the prior art 50% of all chords in the chord sequence do not generate a symbol, as the chord "all keys released" does not generate a symbol. The intent of these embodiments is that the chord for "all keys released" is a valid chord, like any other chord, and is required to be in the keyboard sequence, if it is held valid, similarly to any other chord of the keyboard.

Chording keyboards that do not include "all keys released as a chord" do not meet the limitation in the preamble of "2^n possible keyboard chords," as they have at most 2^n−1 possible keyboard chords.

Another claim emphasizes that, for most cases ("at least 50%), sequential chord pairs that include the chord, "all keys released" produce a non-null symbol.

One may view methods of embodiments as generating a symbol in response to receiving a chord (from a sequence of chords) or as generating a symbol in response to a chord transition, from a first chord to a second chord. These two views are effectively equivalent, as the process of using a chording keyboard consists of keying a sequence of chords. A transition from a first chord to a second chord may be described as a sequential chord pair. Two transitions consisting of a first to second chord, then from the second chord to a third chord (which may be the first chord again), may be described as a sequential chord triplet. Generally, a symbol is output in response to the second chord in a sequential chord pair.

These may be special cases do not limit or negate the primary operating mode of a chording keyboard used in the herein described methods and claims. For example, after a period of non-use, the first transition of the keyboard will be from the chord "all keys released." This transition may be treated special. As a second example, when a user stops using the keyboard, the last chord will be "all keys released." This mode may be detected with a time-out, and the transition to this last chord treated specially.

Three embodiments include all 26 letters of the Roman alphabet in chord tables of 32, 48 and 64 lines. Embodiments include chord tables with exactly one null-symbol that is not the chord, "all keys released." Embodiments include the use of holding a chord for a null-symbol for a minimum predefined time period as a way to indicate either the start of a chording sequence, or the end of a chording sequence, or both. That is, such holding of the "null" chord may be used effectively as an on-off switch.

One claim refers to the ability to generate a double letter by holding the chord for a letter at least a pre-determined period of time. For example, the word "dinner" may be chorded by holding the chord for the letter "n." In this example, only four chord changes are required to enter the word, plus, typically, some delimiting punctuation such as a space.

For symbols that do not normally appear double, such as two commas in a row, or two "q"s in a row, the use of that symbol double may generate a different symbol. For example, a double comma might be the symbol for a semi-colon, or a double "q" might be the symbol for a dollar sign or euro sign. A double period might indicate ellipses or a new paragraph.

Embodiments include the use of a symbol for "backspace." The chord for this symbol may have to be held a minimum period of time to be recognized for this symbol. Holding this chord for yet an even longer minimum period of time may indicate deletion of the prior word, or the word in progress. Embodiments include using the same chord for the null symbol and for backspace, where interpretation of the chord depends on the time the chord is held.

Embodiments include the use and combinations of automatic capitalization; automatic punctuation; and substitution of symbols, number, or both, when their names are spelled out. Embodiments include substitution of conventional spelling for words that are abbreviated, or spelled phonetically, or misspelled. Embodiments include accepting words with double letters spelled with the double letter entered singly, and then correcting the word to conventional spelling. Embodiments include the use of a null-symbol chord to enter a double letter. For example, the word, "dinner" may be chorded as D-I-N-null-N-E R.

The ideal chording keyboard requires very little effort for the user to use. Typically, this means the minimum amount of finger motion or pressure that is still distinctive. Also, typically the amount of hand motion, or "sideways" finger motion should be minimal, except perhaps for the thumb. Thus, an ideal chording keyboard positions keys at or close to the fingertips of a relaxed hand. Some embodiments require motion or pressure along the axis of the finger—in the distal direction. This is the mode of a conventional QWERTY keyboard, or a piano keyboard, with the fingers partially bent. Other embodiments require motion or pressure of the fingertips in an arc that follows the normal bending of a finger, as a first is closed, along the palmar axis of the hand. In this embodiment, the pad of the end of the finger may be used more than the fingertip, as the contact point, or leading point of the finger in actuating the key. A preferred and unique embodiment of this invention is the placement of keys to accept this latter, palmar, direction of motion, as compared to the prior art that uses the former, distal, motion of the fingertips. This embodiment permits the keyboard to be predominantly held in the hand, rather than requiring the keyboard to be physically separate from the hand.

It is important to realize that a keyboard need not always operate in the methods described herein to be part of the claimed invention. A keyboard may have additional modes that operate differently than the described methods. Nonetheless, if the keyboard operates, or is capable of operating using the described methods, it is part of the claimed invention. For example, a keyboard may have one or more keys that do not operate in the chording fashion of the methods described herein. However, if some of the keys, some of the time, perform the methods described herein, the keyboard is in the scope of the claims of this invention.

Embodiments include chording keyboards that use, or are able to use, any one of the method claims of this invention. Software, firmware or other implementations, that implement one or more methods or embodiments of this invention, using a physical keyboard that is not provided in conjunction with the software, firmware or other implementation, nonetheless are within the scope of this claimed invention.

Definitions

"Ambiguous Chords"—in the process of a user moving from a first intended chord to a second intended chord the keyboard may move briefly through one or more unintended chords. In such case, determining which chords are intended by the user and which chords are in fact unintended intermediate keyboards states makes the output of the keyboard ambiguous.

"Characters, Letters and Symbols"—The terms, "character", "letters" and "symbol," and their plurals, are generally different terms for the same thing, unless other meaning is clear. The term symbol is the most general. The term, "letters" is convenient to understand in the context of generating words. The term, "characters" may include both letters and punctuation. All three terms may include symbols used in computer programming languages, diacritical marks, punctuation and commands (such as a new paragraph or backspace), and symbols for special purposes such as writing music.

"Disambiguation"—the process, method or steps to determine a likely intended chord, keyboards state transition, or series of chord transitions.

"Finger"—Unless otherwise clear from the context, a finger may include a thumb.

"Keyboard State Table" and "Chord Table"—are two terms used interchangeably. A "keyboard state" and a "keyboard chord" are generally two terms used interchangeably, unless a distinction is made clear in the context.

"Keyboard State" or "Chord"—is any physically possible combination of key positions in a chording keyboard. A chord may be the state where all keys are released. Note that multiple keyboard states may occur in a sequence to generated an accepted or output chord.

"Press" and "Depress"—are two names for the same action or state.

"Subset of keys"—Unless otherwise clear from the context, a subset of keys may include no keys or all keys.

"Symbol"—Symbols may include letters; digits; traditional text symbols such as an at-sign, percent sign, comma, etc.; text control information such as new-paragraph or backspace; symbols used in computer programming languages; phonemes and pronunciation symbols; text symbols used in languages that do not use the Roman alphabet; braille; music symbols; mathematical symbols; type-setting and printing symbols; editing symbols; acronyms; symbols to represent hand signals including sign language motions; industry specific symbols, terms and abbreviations; user-generated symbols, and one or more null-symbols.

"Table, Chart, and Map"—Use of the words, "table," "chart," and "map" may be terms generally interchangeably, unless a distinction is clear from the context.

"Word pool" and "word set"—These phrases are used interchangeably to describe the set of words under consideration as a word is generated, before a final word from the pool is selected and outputted.

"Word"—The term, "word," covers a wide range of symbol strings, including sub-words and other strings that are not in a traditional, constant written language dictionary. As examples: a dictionary may include names, abbreviations, acronyms, portions of a program in a programming language, text from historical usage of one or more users, and similar non-traditional sources of symbol strings.

Ideal, Ideally, Optimum and Preferred—Use of the words, "ideal," "ideally," "optimum," "optimal," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal" and "feature," when used in the context of describing this invention, refer specifically to one or more embodiments of this invention. Described benefits refer only to those embodiments that provide that benefit. All descriptions, examples, and scenarios herein are non-limiting, as one trained in the art will appreciate.

All examples are sample embodiments. In particular, the phrase "invention" should be interpreted under all conditions to mean, "an embodiment of this invention." Examples, scenarios, drawings, applications, and claimed benefits herein are non-limiting. The only limitations of this invention are in the claims.

All combinations and sub-combinations of all features, embodiments, claims and claim limitations are explicitly included as embodiments herein. In particular, the limitations in all of the dependent claims are also claimed as dependent claims from all other independent claims.

We claim:

1. A method of generating symbols using a chording keyboard comprising n, at least two-position, keys; wherein the keyboard comprises at least $2^n$ possible keyboard chords; comprising the steps:
   a) creating a chord table containing at least $2^n$ lines, one line for each possible chord;
   b) associating one symbol, from a pre-defined first symbol set consisting of S unique symbols, with each line in the chord table;
   c) accepting a chord from the chording keyboard;
   d) outputting the symbol associated with the chord;
   e) repeating from step c);
   wherein n is at least 4 and less than 10; and
   wherein when the keyboard generates any first chord in the set of $2^n$ consisting of a first depressed subset of keys and the keyboard then generates immediately following any second chord in the set of $2^n$ chords comprising a second, different, depressed subset of the n keys,
   wherein the transition from the first chord to the second chord is free of any required key transitions other that those required to transition directly from the first depressed subset of n keys to the second depressed subset of n keys;

wherein the chord table comprises the following partial chord table:

| Symbol | Chord |
|---|---|
| Space | X O O O O |
| Letter E | X X X X O |
| Letter T | X X O O O |
| Letter A | O X O O X |
| Letter O | X X O O X |
| Letter I | X O X X O | wherein the order of the keys for the chords shown above is, left to right, thumb, index finger, middle finger, ring finger, pinky finger, and wherein X means the corresponding key depressed and O means the corresponding key released.

\* \* \* \* \*